United States Patent
Gundogan et al.

(10) Patent No.: US 11,569,888 B1
(45) Date of Patent: Jan. 31, 2023

(54) ENHANCED MULTI-PANEL USER EQUIPMENT MEASUREMENT FOR IMPROVED MOBILITY ROBUSTNESS

(71) Applicant: NOKIA TECHNOLOGIES OY, Espoo (FI)

(72) Inventors: Alperen Gundogan, Munich (DE); Ingo Viering, Munich (DE); Ahmad Awada, Munich (DE); Jedrzej Stanczak, Wroclaw (PL); Christian Rom, Aalborg (DK); Halit Murat Gursu, Munich (DE); Panagiotis Spapis, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/395,062

(22) Filed: Aug. 5, 2021

(51) Int. Cl.
| | | |
|---|---|---|
| *H04L 5/12* | (2006.01) | |
| *H04B 7/06* | (2006.01) | |
| *H04B 17/15* | (2015.01) | |
| *H04B 17/29* | (2015.01) | |

(52) U.S. Cl.
CPC .......... *H04B 7/0639* (2013.01); *H04B 17/15* (2015.01); *H04B 17/29* (2015.01)

(58) Field of Classification Search
CPC ....... H04B 7/0639; H04B 17/15; H04B 17/29
USPC ......................................................... 375/262
See application file for complete search history.

(56) References Cited

U.S. PATENT DOCUMENTS

| | | | | |
|---|---|---|---|---|
| 9,661,639 | B2 * | 5/2017 | Nader | H04W 36/0085 |
| 10,856,303 | B2 * | 12/2020 | Kim | H04L 5/0051 |
| 2010/0112958 | A1 * | 5/2010 | Krishnamurthy | H04B 17/26 |
| | | | | 455/67.11 |
| 2014/0155049 | A1 * | 6/2014 | Hamilton | H04W 24/02 |
| | | | | 455/418 |
| 2016/0105265 | A1 * | 4/2016 | Wang | H04L 5/0048 |
| | | | | 370/252 |
| 2017/0324459 | A1 * | 11/2017 | Koskela | H04W 24/08 |
| 2019/0058508 | A1 * | 2/2019 | Yiu | H04B 7/043 |
| 2019/0141557 | A1 * | 5/2019 | da Silva | H04B 17/30 |
| 2020/0220581 | A1 * | 7/2020 | Yiu | H04B 7/0408 |
| 2020/0344628 | A1 * | 10/2020 | Awada | H04W 36/0094 |
| 2021/0250798 | A1 * | 8/2021 | Jeong | H04W 24/10 |

OTHER PUBLICATIONS

TSG-RAN meeting #17 RP-020641, Qualcomm( Layer 3 filtering considerations) Biarritz, France, Sep. 3-6, 2002.*

* cited by examiner

*Primary Examiner* — Helene E Tayong
(74) *Attorney, Agent, or Firm* — Squire Patton Boggs (US) LLP

(57) ABSTRACT

Systems, methods, apparatuses, and computer program products for improving measurement accuracy for multi-panel UEs with a single baseband unit are provided. One method may include receiving, by a user equipment, at least one of at least one layer 3 filter time constant $T_{cst\_x}$, or at least one scaling factor, and updating, by the user equipment, at least one current filter time constant according to at least one of the received $T_{cst\_x}$, or the at least one scaling factor.

18 Claims, 15 Drawing Sheets

– FilterCoefficient

The IE *FilterCoefficient* specifies the measurement filtering coefficient. Value *fc0* corresponds to $k = 0$, *fc1* corresponds to $k = 1$, and so on.

FilterCoefficient information element

```
-- ASN1START
-- TAG-FILTERCOEFFICIENT-START

FilterCoefficient ::=   ENUMERATED { fc0, fc1, fc2, fc3, fc4, fc5, fc6, fc7, fc8, fc9, fc11, fc13, fc15, fc17, fc19, spare1, ...}

-- TAG-FILTERCOEFFICIENT-STOP
-- ASN1STOP

FilterConfig ::=        SEQUENCE {
    filterCoefficientRSRP           FilterCoefficient           DEFAULT fc4,
    filterCoefficientRSRQ           FilterCoefficient           DEFAULT fc4,
    filterCoefficientRS-SINR        FilterCoefficient           DEFAULT fc4
}

FilterConfigCLI-r16 ::= SEQUENCE {
    filterCoefficientSRS-RSRP-r16   FilterCoefficient           DEFAULT fc4,
    filterCoefficientCLI-RSSI-r16   FilterCoefficient           DEFAULT fc4
}

QuantityConfigUTRA-FDD-r16 ::= SEQUENCE {
    filterCoefficientRSCP-r16       FilterCoefficient           DEFAULT fc4,
    filterCoefficientEcN0-r16       FilterCoefficient           DEFAULT fc4
}

-- TAG-QUANTITYCONFIG-STOP
-- ASN1STOP
```

FIG. 3

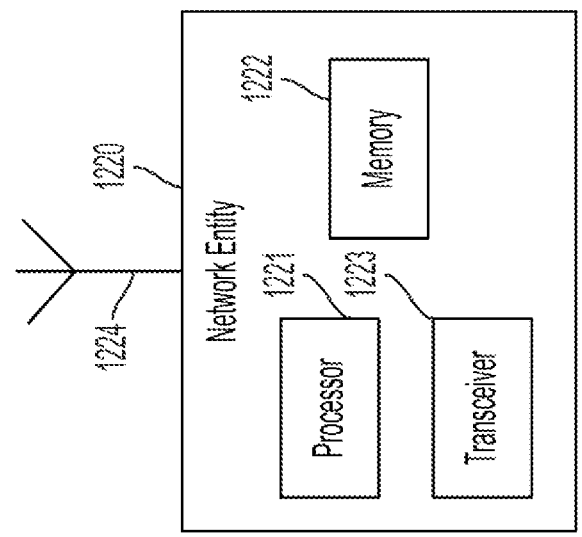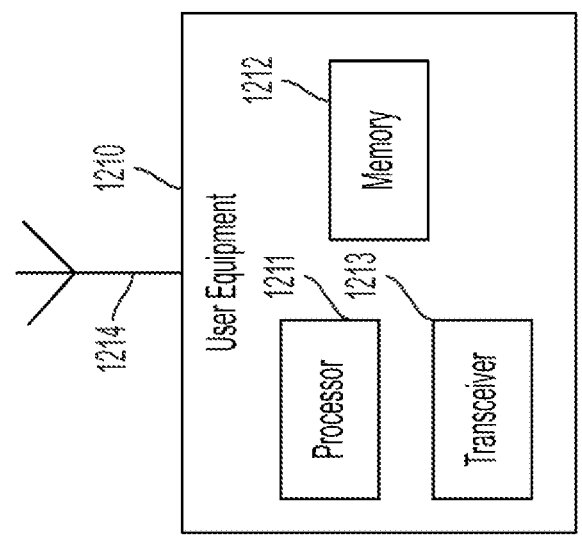
FIG. 12

ENHANCED MULTI-PANEL USER EQUIPMENT MEASUREMENT FOR IMPROVED MOBILITY ROBUSTNESS

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for improving measurement accuracy for multi-panel user equipment (UEs) with a single baseband unit.

BACKGROUND

Examples of mobile or wireless telecommunication systems may include 5G RAT, the Universal Mobile Telecommunications System (UNITS) Terrestrial Radio Access Network (UTRAN), LTE Evolved UTRAN (E-UTRAN), LTE-Advanced (LTE-A), LIE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. NR is expected to support service categories such as enhanced mobile broadband (eMBB), ultra-reliable low-latency-communication (URLLC), and massive machine-type communication (mMTC). NR is also expected to deliver extreme broadband, ultra-robust, low-latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LIE) may be referred to as next-generation Node B (gNB) when built on NR radio, and may be referred to as next-generation eNB (NG-eNB) when built on E-UTRA radio.

SUMMARY

In accordance with some example embodiments, a method may include configuring, by a network entity, at least one layer 3 filter coefficient $k_{L3}$. The method may further include transmitting, by the network entity, at least one of at least one layer 3 filter time constant $T_{cst\_x}$, or at least one scaling factor to at least one user equipment.

In accordance with certain example embodiments, an apparatus may include means for configuring at least one layer 3 filter coefficient $k_{L3}$. The apparatus may further include means for transmitting at least one of at least one layer 3 filter time constant $T_{cst\_x}$, or at least one scaling factor to at least one user equipment.

In accordance with various example embodiments, an apparatus may include at least one processor and at least one memory including computer program code. The at least one memory and the computer program code may be configured to, with the at least one processor, cause the apparatus to at least configure at least one layer 3 filter coefficient $k_{L3}$. The at least one memory and the computer program code may be further configured to, with the at least one processor, cause the apparatus to at least transmit at least one of at least one layer 3 filter time constant $T_{cst\_x}$, or at least one scaling factor to at least one user equipment.

In accordance with some example embodiments, a non-transitory computer readable medium may be encoded with instructions that may, when executed in hardware, perform a method. The method may include configuring at least one layer 3 filter coefficient $k_{L3}$. The method may further include transmitting at least one of at least one layer 3 filter time constant $T_{cst\_x}$, or at least one scaling factor to at least one user equipment.

In accordance with certain example embodiments, a computer program product may perform a method. The method may include configuring at least one layer 3 filter coefficient $k_{L3}$. The method may further include transmitting at least one of at least one layer 3 filter time constant $T_{cst\_x}$, or at least one scaling factor to at least one user equipment.

In accordance with various example embodiments, an apparatus may include circuitry configured to configure at least one layer 3 filter coefficient $k_{L3}$. The circuitry may further be configured to transmit at least one of at least one layer 3 filter time constant $T_{cst\_x}$ or at least one scaling factor to at least one user equipment.

In accordance with some example embodiments, a method may include receiving, by a user equipment, at least one of at least one layer 3 filter time constant $T_{cst\_x}$ or at least one scaling factor. The method may further include updating, by the user equipment, at least one current filter time constant according to at least one of the received $T_{cst\_x}$ or the at least one scaling factor.

In accordance with certain example embodiments, an apparatus may include means for receiving at least one of at least one layer 3 filter time constant $T_{cst\_x}$ or at least one scaling factor. The apparatus may further include means for updating at least one current filter time constant according to at least one of the received $T_{cst\_x}$ or the at least one scaling factor.

In accordance with various example embodiments, an apparatus may include at least one processor and at least one memory including computer program code. The at least one memory and the computer program code may be configured to, with the at least one processor, cause the apparatus to at least receive at least one of at least one layer 3 filter time constant $T_{cst\_x}$ or at least one scaling factor. The at least one memory and the computer program code may be further configured to, with the at least one processor, cause the apparatus to at least update at least one current filter time constant according to at least one of the received $T_{cst\_x}$ or the at least one scaling factor.

In accordance with some example embodiments, a non-transitory computer readable medium may be encoded with instructions that may, when executed in hardware, perform a method. The method may include receiving at least one of at least one layer 3 filter time constant $T_{cst\_x}$ or at least one scaling factor. The method may further include updating at least one current filter time constant according to at least one of the received $T_{cst\_x}$ or the at least one scaling factor.

In accordance with certain example embodiments, a computer program product may perform a method. The method may include receiving at least one of at least one layer 3 filter time constant $T_{cst\_x}$ or at least one scaling factor. The method may further include updating at least one current filter time constant according to at least one of the received $T_{cst\_x}$ or the at least one scaling factor.

In accordance with various example embodiments, an apparatus may include circuitry configured to receive at least one of at least one layer 3 filter time constant $T_{cst\_x}$ or at least one scaling factor. The circuitry may further be configured to update at least one current filter time constant according to at least one of the received $T_{cst\_x}$ or the at least one scaling factor.

BRIEF DESCRIPTION OF THE DRAWINGS

For proper understanding of example embodiments, reference should be made to the accompanying drawings, wherein:

FIG. 3 illustrates an example of Third Generation Partnership Project (3GPP) filtering coefficients.

FIG. 12 illustrates an example of various network devices, according to some example embodiments.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for improving measurement accuracy for multi-panel user equipment (UEs) with a single baseband unit is not intended to limit the scope of certain example embodiments, but is instead representative of selected example embodiments.

Figure 1:
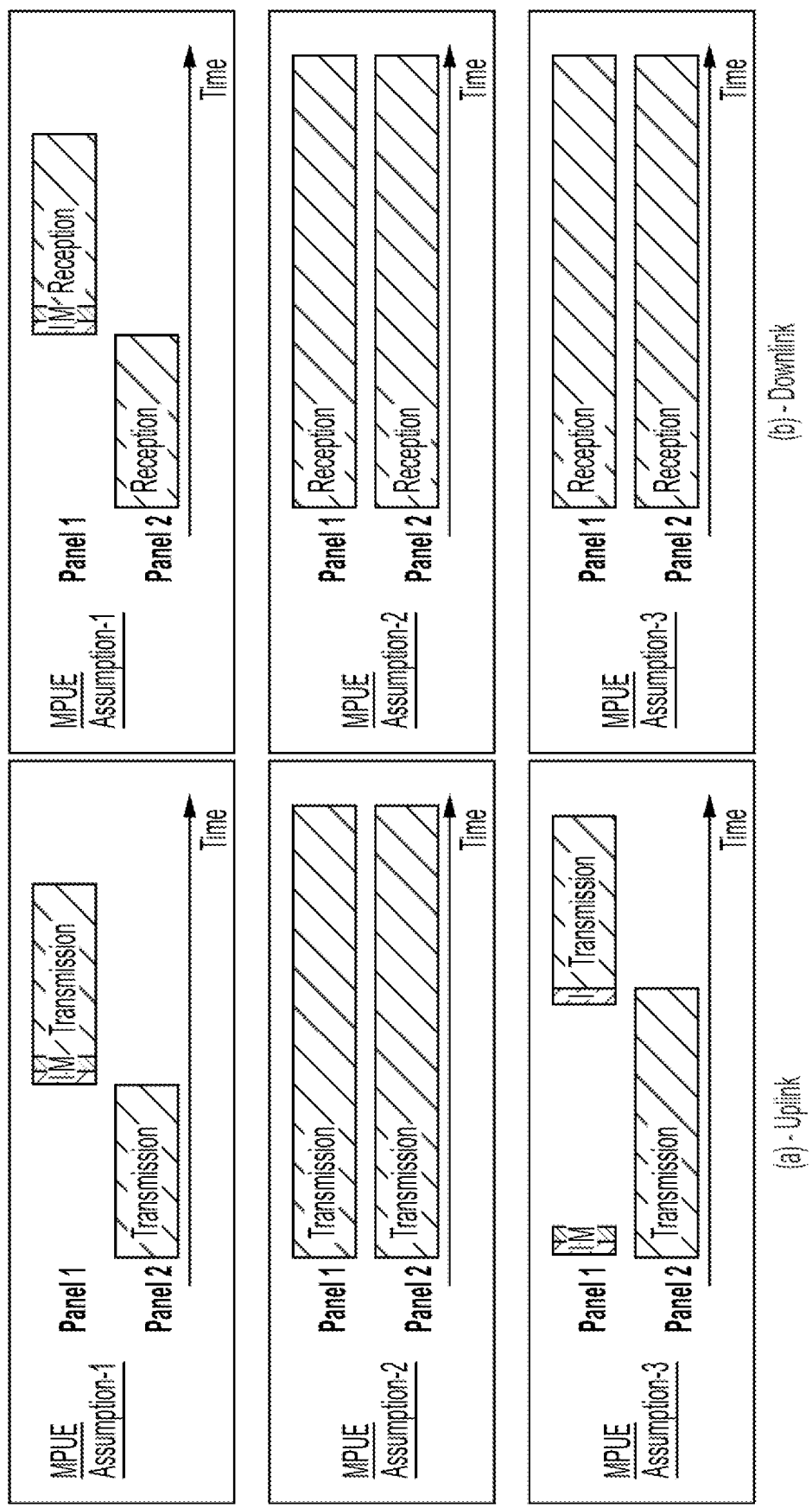
FIG. 1(a) illustrates an example of uplink panel activation and operations for different multi-panel user equipment (MPUE) implementation assumptions.
FIG. 1(b) illustrates an example of downlink panel activation and operations for different multi-panel user equipment (MPUE) implementation assumptions.

A UE may simultaneously transmit and receive data using multiple antenna panels, depending on the UE hardware architecture. However, such multi-panel UE (MPUE) implementations may result in a several different UE capabilities and power consumption levels. In some MPUE hardware categories ("MPUE-Assumption 1" in FIG. 1), multiple panels may be implemented on a UE, but only one of those panels may be activated at a time for uplink (UL) and downlink (DL). In addition, only a single baseband processing chain may be used to measure synchronization signal blocks (SSBs) on each of them, requiring the UE to follow a panel switching schedule (e.g., the UE switches the baseband connection to a single antenna panel one at a time during SSB bursts to measure SSBs). As a result, the activation of, and switching to, an antenna panel creates a switching delay, which could be approximately 3 milliseconds.

In some other MPUE hardware categories ("MPUE-Assumption 2"), multiple antenna panels may be implemented on a UE, and multiple panels may be activated at the same time, with one or more panels used for transmission (see middle of FIG. 1a) and reception (see middle of FIG. 1B). In other MPUE hardware categories ("MPUE-Assumption 3"), multiple panels may be implemented on a UE, and multiple panels may be activated at a single time for reception and measurements since each panel has its own baseband processing chain. However, only one panel may be used for transmission (see bottom of FIG. 1(a) and (b)).

MPUE-Assumption 1 may be considered a common implementation for many UEs since it may be too complex, expensive, and energy-intensive to have multiple simultaneously active panels. In many cases for MPUE-Assumption 1, the MPUE has several RF antenna modules connected to a single baseband architecture; as a result, the RF module may likely be activated early to allow for a quasi-instantaneous switch of panels. Thus, the duration of activation (A boxes in FIG. 1) and measurement (M boxes in FIG. 1) may vary based on MPUE RF module design. The main limitation of MPUE-Assumption 1 is to have a single baseband digital unit.

Figure 2:
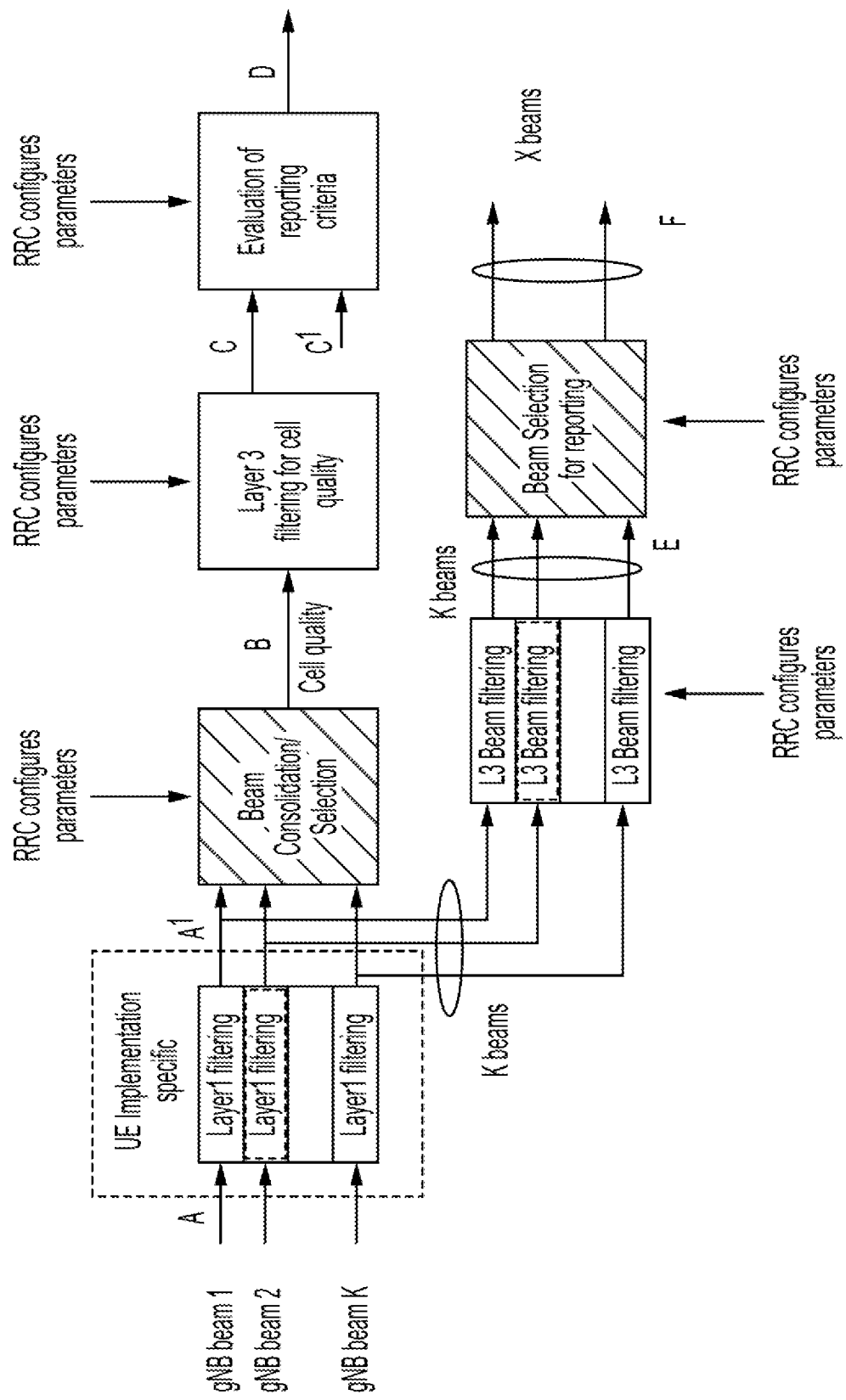
FIG. 2 illustrates an example of a measurement model.

FIG. 2 illustrates an example of a measurement model for a UE. Specifically, the beams at step A in FIG. 2 can refer to SSB or channel state information reference signal (CSI-RS) resources. The UE may apply UE-implementation specific Layer 1 (L1) averaging (for example, with 5 samples) to the set of beams to reduce fluctuations in measurements caused by fast fading and measurement error. The accuracy of the L1 measurements may depend on the UE implementation; however, a certain minimum accuracy may be achieved by performance requirements. In general, the UE can select any L1 sampling rate, filter realization, or L3 output rate so long as the minimum requirements are satisfied. At step B in FIG. 2, the average of N strongest beams above a threshold are fed into an infinite impulse response (IIR) L3 filtering procedure, which may be defined as $F_n=(1-\alpha)*F_{n-1}+\alpha*M_n$ where $M_n$ is the latest received cell quality measurement (i.e., at step B), and $F_n$ is the updated measurement result used for evaluation of reporting criteria and report at step C. The forgetting factor may be $$2^{\frac{-k_{L3}}{4}},$$

where $k_{L3}$ is the L3 filterCoefficient for the corresponding measurement quantity (e.g., RSRP or RSRQ), and defined in the MeasObjectNR which can be sent to the UE along with RRC reconfiguration message or the RRC resume message. The value of the L3 filterCoefficient may be between 0 and 19, as shown in FIG. 3.

The a value may be adapted such that the time characteristics of the filter can be preserved at different input rates, observing that the filterCoefficient assumes a sample rate equal to X ms. The value of X is equivalent to one intra-frequency L1 measurement period, which may assume non-DRX operation and/or depend on frequency range. The minimum measurement period to generate one L1 filtered sample in frequency range 1 (FR1) and frequency range 2 (FR2) may be 200 ms and 400 ms, respectively. In addition, the network may signal filterCoefficient $k_{L3}$ to the MPUE using an RRC Reconfiguration message.

Based on t $k_{L3}$ and X ms values, the UE may derive an initial a value for L3 filtering calculations, and the filter time constant $T_{cst}$ (assuming that sampling rate equal to X ms), which may be calculated according to $T_{cst}=$ $$\frac{-X \cdot \ln(2)}{\ln(1-\alpha)} = \frac{-X}{\log_2(1-\alpha)}.$$

The delay between the L1 and L3 filtering measurements may be estimated by the filter time constant, which may be defined as the time duration after which $(1-\alpha)$ reduces to half ($(1-\alpha)$ is a constant value taking $$\alpha = 2^{\frac{-k_{L3}}{4}} \Big).$$

For example, $(1-\alpha)$ may be the value that adjusts the impact of previous measurements (i.e., $F_{n-1}$) on the new measurement (i.e., $M_n$). As stated, L1 of the UE can be limited to measure at various sampling rate (i.e., $T_{smp}$) depending on number of panels, the switching schedule, and the switch delay. For MPUEs, a new $\alpha'$ may be calculated such that the filter time constant $T_{cst}$ of the filter is preserved according to $$(1-\alpha) = (1-\alpha')^{\frac{X}{T_{smp}}}.$$

Thus, the UE may derive a new forgetting factor $\alpha'$ for its sampling rate $T_{smp}$ based on the configured filter coefficient $k_{L3}$ (leading to forgetting factor a) corresponding to a specified sample rate X.

SSBs may be available, for example, every X=20 ms. Thus, if a UE has 4 panels, without any switching delay, and a round robin switching schedule, the sampling rate would be $T_{smp}$=80 ms. As a result, MPUE Assumption 1 would need a higher alpha value to match the forgetting factor of a typical UE. For example, if $\alpha$ is 0.5, $\alpha'$ would be 0.9625.

Under MPUE Assumption 1, only one panel can be active per time-instant; thus, the MPUE may need more time to obtain measurements (e.g., reference signal received power (RSRP), reference signal received quality (RSRQ)), since only one panel is active at a time. The activation of each panel is UE implementation specific, and may happen in round-robin (RR) sequence.

Figure 4:
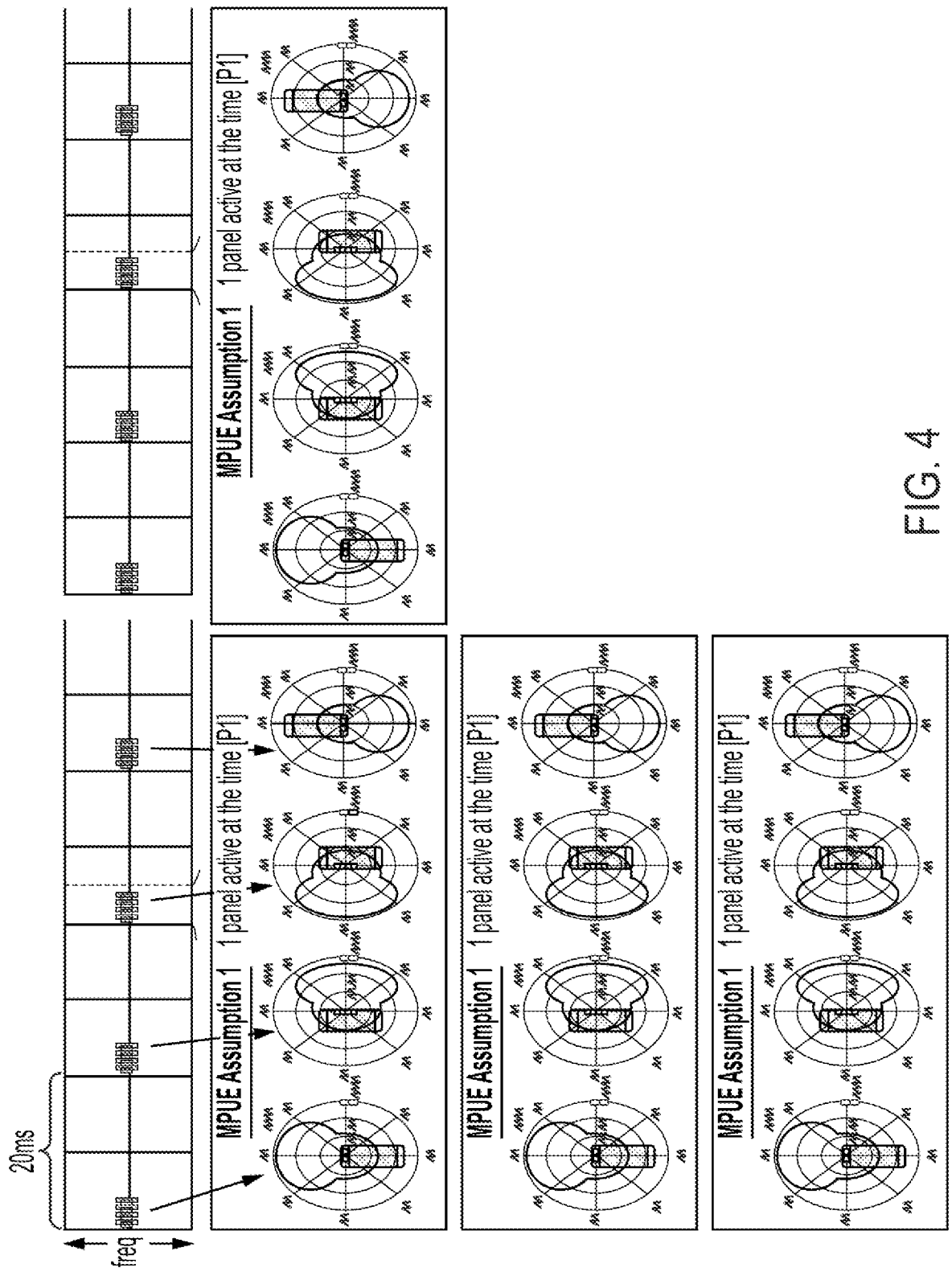
FIG. 4 illustrates an example of user equipment (UE) panel scan rates with round robin scan rates of {1, ½, ¼}, respectively.
Figure 4:
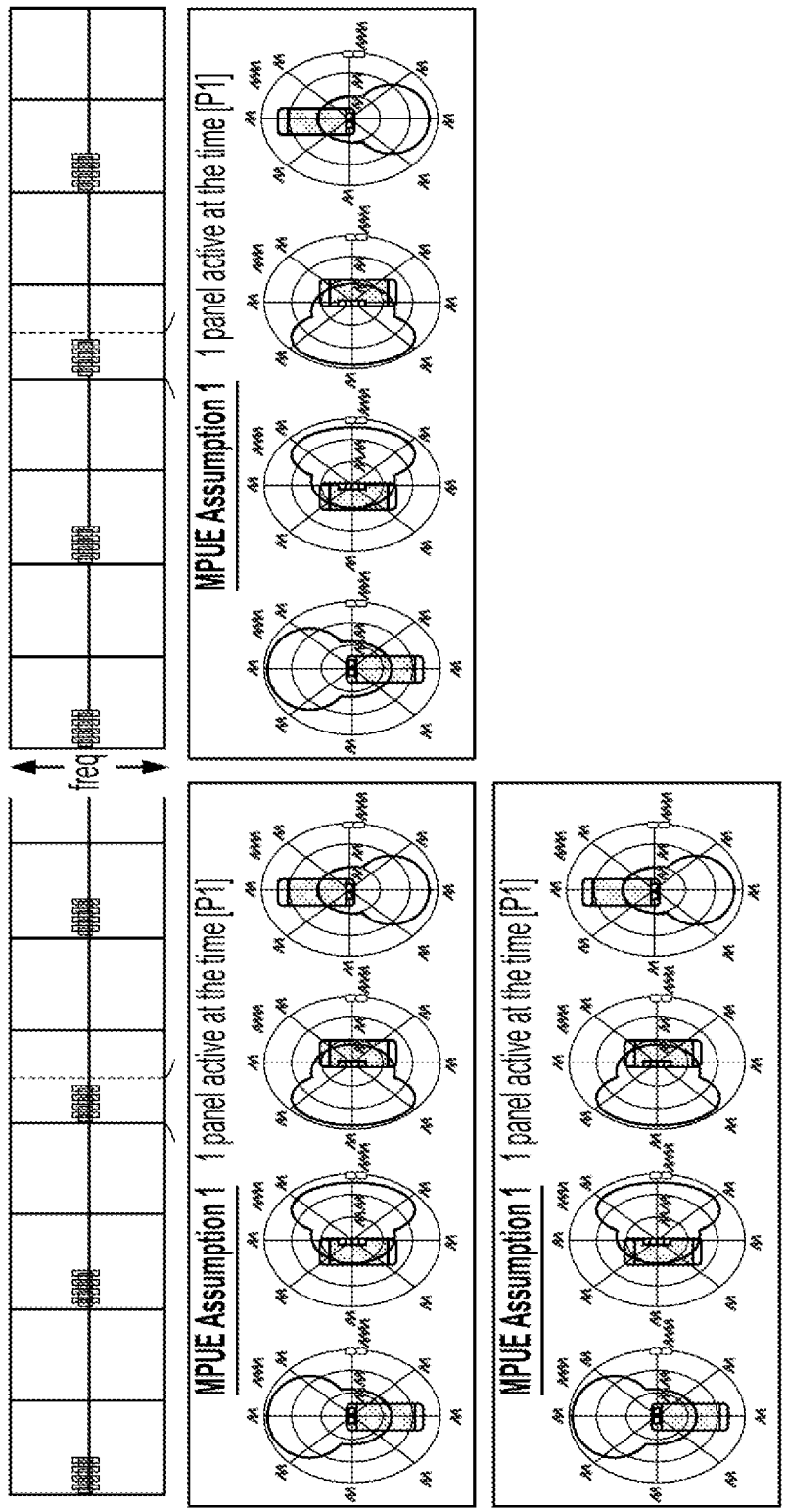

FIG. 4 illustrates an example of different RR panel scan rates, with SSB burst periodicities of 20 ms. The sampling rate of the measurements with MPUE Assumption-1 is shown as {1/80 ms, 1/160 ms, 1/320 ms} for RR scan rates of {1, 1/2, 1/4}, respectively. The sampling rate may drop even further, depending on the MPUE panel scan rate. It is noted that the network has no control of the MPUE panel scan rate; therefore, L1 sampling rates and L3 input rates equal one measurement period $A^1$.

Inter-cell mobility procedures may include baseline handover (HO), conditional handover (CHO), and dual active protocol stack (DAPS). In all procedures, handover may be initiated by network-configured events. For example, in baseline HO, once an A3 event (or other configured Ax event) condition is fulfilled, the UE may send a measurement report, and the serving cell may prepare the target cell (e.g., one of the cells indicated in the measurement report). Event A3 may provide a handover preparation triggering mechanism based upon the measurement results at step C in FIG. 2. Event A3 may be fulfilled if it fulfills the condition $M_N+CIO_{HO}>M_S+off_{HO}$, where $M_N$ is the measurement of the neighboring cell, $M_S$ is the measurement of the serving cell, $off_{HO}$ is an offset value (also called HO hysteresis or HO margin), and $CIO_{HO}$ is a cell individual offset. A3 event expires (and the UE sends a measurement report) if this condition is fulfilled for each measurement $M_N$ during a certain time to trigger $TTT_{HO}$.

It is still important for the handover decisions to remain very reliable; in order to avoid the condition expiring erroneously, conservative L3 filtering, $TTT_{HO}$ and $off_{HO}$ $ICIO_{HO}$ may be used. The erroneous expiration may generate significant unnecessary signalling, failures if the selected cell has no stable radio conditions, and/or ping-pongs causing additional signaling overhead over the $U_u$ and $X_n$ interfaces and radio resource reservation.

Figure 5:
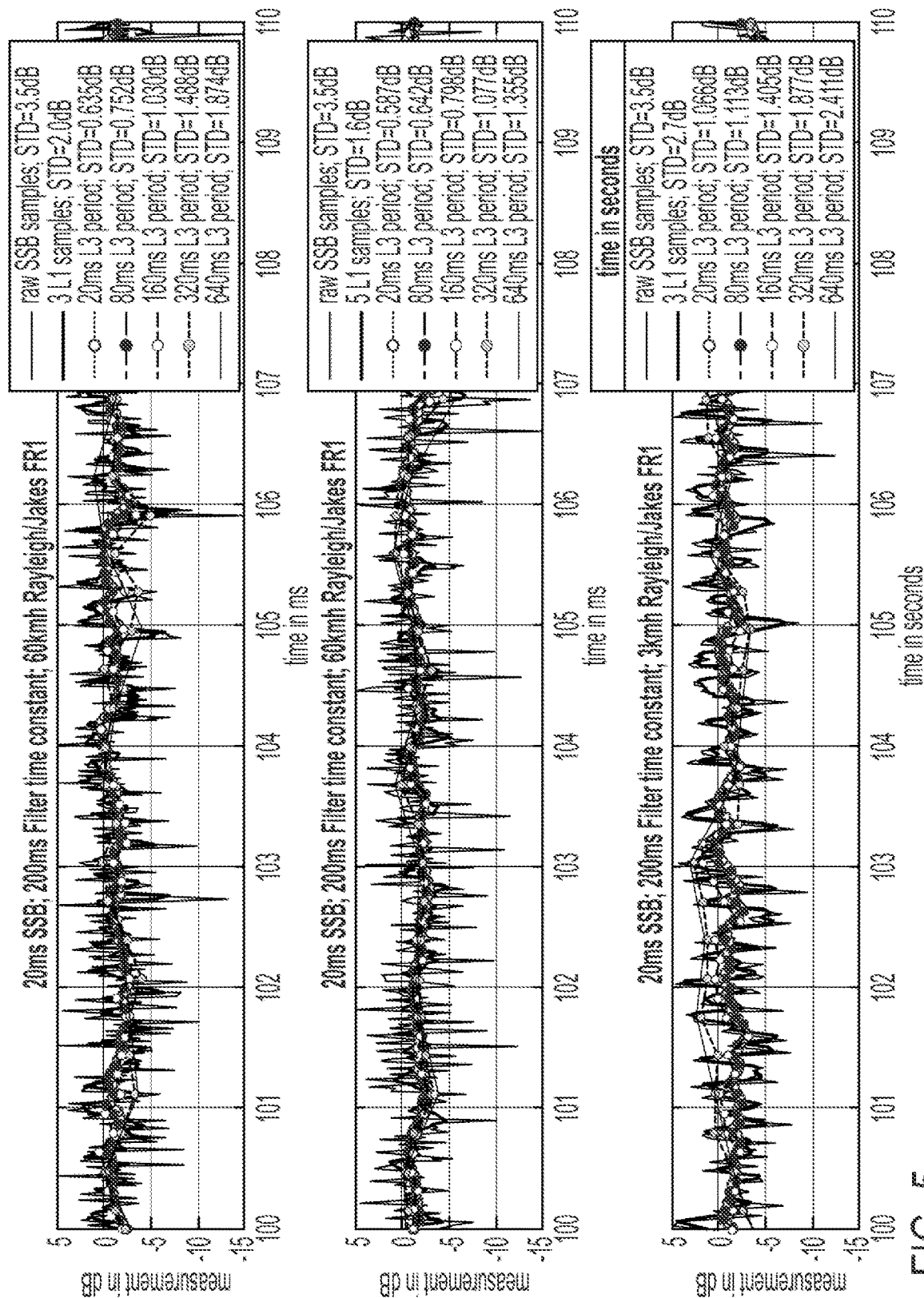
FIG. 5 illustrates an example of frequency range 1 (FR1) measurement accuracy with fixed filter time constants.
Figure 6:
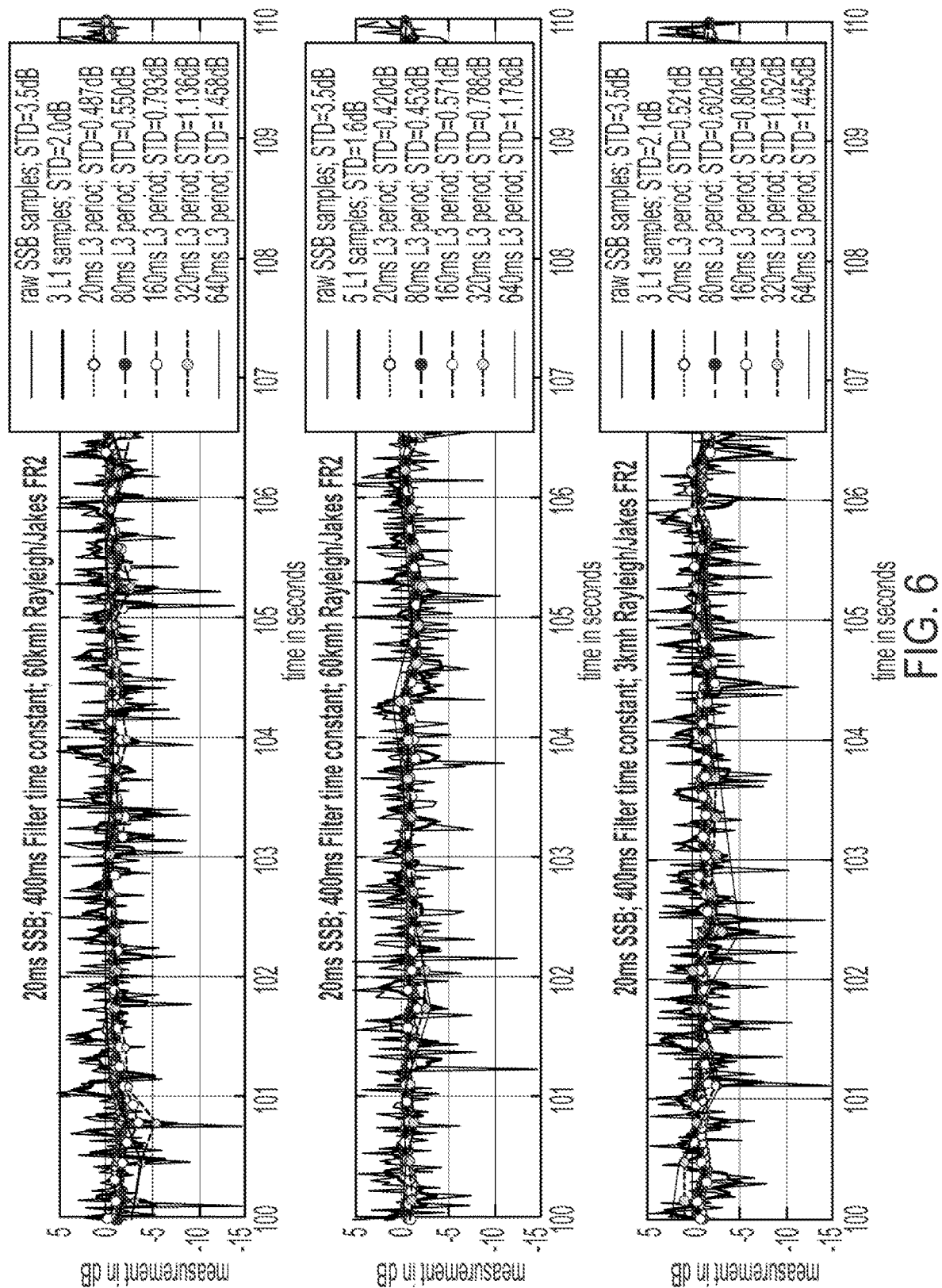
FIG. 6 illustrates an example of frequency range 2 (FR2 measurement accuracy with fixed filter time constants.

Various simulations demonstrate the impact of the different L3 input rates on measurement accuracy, as well as the measurement accuracy in terms of standard deviation. FIGS. 5 and 6 illustrate examples of the measurement accuracy for FR1 and FR2 cases, respectively. The measurement accuracy may be interpreted based on the standard deviation after L3 filtering. In this example, L3 filter coefficient $k_{L3}$ may be set to 4; thus, the L3 filter time constant may be calculated as 200 ms for FIG. 1 (FR1) and 400 ms for FIG. 2 (FR2). Each figure depicts 3 different cases: the top depicts 3 samples used in L1 filtering with a UE speed of 60 km/h; the middle depicts 5 samples used in L1 filtering with a UE speed of 60 km/h; and the bottom depicts 3 samples used in L1 filtering with a UE speed of 3 km/h. As a result, L3 filtering output becomes more inaccurate (based on standard deviation) when L3 sampling period (input rate) increases, especially if the L3 sampling period is higher than the filter time constant. As long as the L3 sampling period is below a filter time constant, this effect is relatively small.

Based on the simulation results, there is a problem with larger L3 sampling periods. Long L3 sampling periods are likely, especially for MPUE Assumption-1 as certain panels are not measured often enough due to panel activation restrictions. In addition, the network has no control on the MPUE panel activation and L3 sampling periods since they are UE implementation specific. This impacts the network since unreliable measurements can lead to ping-pongs, and even radio link failures (RLFs), which can increase the interruption time of the UEs. Currently, the filter time constant is configured by the network at once, as shown in FIG. 3, and not changed until the UE receives new configurations, e.g., RRC reconfiguration and corresponds to L1 measurement period X.

Certain example embodiments described herein may provide various benefits and/or advantages to overcome the disadvantages described above. For example, certain example embodiments may ensure high measurement accuracy of L3 filtering, enabling reliable mobility decisions regardless of the MPUE panel activation algorithm. In this way, the network is unaware of the panel implementation details of the UE, including the activation status, and thus the input rate of the L3 filter. The measurement accuracy of L3 filtering remains under the control of the network. Thus, certain example embodiments discussed below are directed to improvements in computer-related technology.

Figure 8:
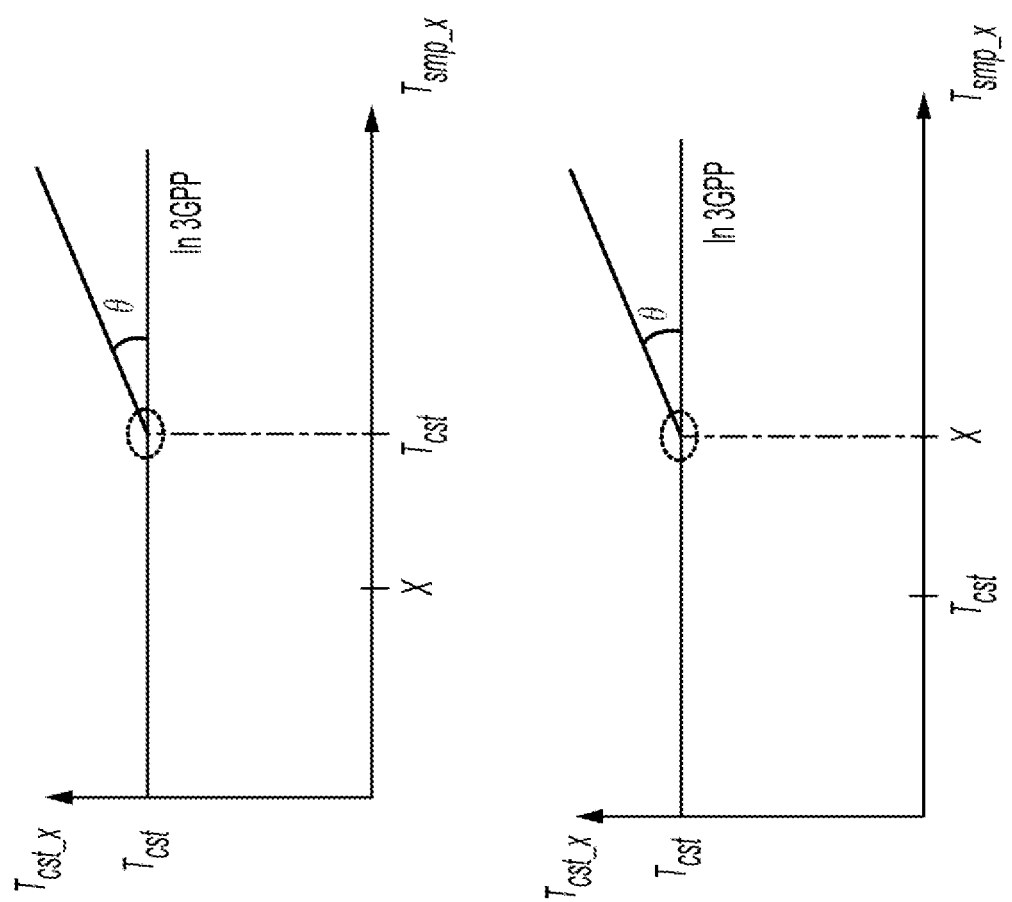
FIG. 8 illustrates examples of scaling time characteristics of the filtering, according to some example embodiments.

As will be discussed in more detail below, certain example embodiments may improve measurement accuracy for MPUEs with a single baseband unit (i.e., MPUE Assumption-1). Specifically, the UE may modify the scaling of the filter coefficient such that filter time constant increases when an L3 sampling rate increases based on network configuration, especially when the L3 sampling rate is larger than the filter time constant $T_{cst}$; for example, as illustrated in FIG. 8, X axis represents the L3 sampling rate of the UE, and Y axis represents the filter time constant. The network may provide a scaling factor (e.g., tan(θ)) when the UE performs scaling (e.g., if the L3 sampling rate is higher than time constant derived from the configured filter coefficient). The configurations may be defined in the MeasObjectNR, which may be sent to the UE along with an RRC reconfiguration message.

Figure 7:
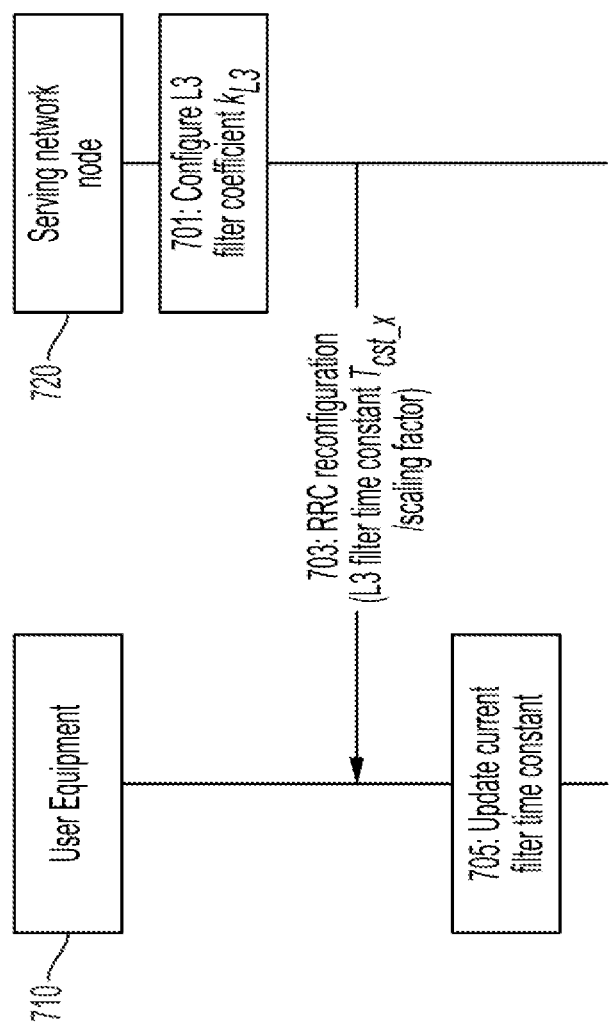
FIG. 7 illustrates an example of a signaling diagram, according to certain example embodiments.

FIG. 7 illustrates an example of a signaling diagram, according to certain example embodiments. In particular, the example signalling diagram of FIG. 7 depicts how to improve measurement accuracy for multipanel UEs with a single baseband unit, according to certain example embodiments. UE 710 and NE 720 may be similar to UE 1210 and NE 1220, as illustrated in FIG. 12, according to certain example embodiments.

At 701, NE 720 may configure at least one L3 filter coefficient $k_{L3}$. In various example embodiments, NE 720 may calculate the at least one L3 filter time constant $T_{cst\_x}$ according to at least one of at least one L3 filter time constant $T_{cst}$ derived from the at least one L3 filter coefficient $k_{L3}$, at least one input rate of L3 infinite impulse response filtering $T_{smp}$, at least one sampling rate X, and at least one scaling factor.

In some example embodiments, the at least one L3 filter time constant $T_{cst\_x}$ may be calculated according to $T_{cst\_x} = T_{cst} + \max((T_{smp} - \max(T_{cst}, X)), 0) \tan(\theta)$, wherein $$T_{cst} = \frac{-X \cdot \ln(2)}{\ln(1-\alpha)} = \frac{-X}{\log_2(1-\alpha)}, \alpha = 2^{\frac{-k_{L3}}{4}},$$

X comprises a sampling rate, $k_{L3}$ comprises a filter coefficient associated with L3 infinite impulse response filtering, $T_{smp}$ comprises a sampling period of L3 infinite impulse response filtering, a comprises a float, and tan(θ) comprises a scaling factor.

In various example embodiments, the at least one filter coefficient $k_{La}$ may include an L3 filterCoefficient and/or a value from 0 to 19. Additionally or alternatively, the scaling factor tan(θ) may be applied when sampling period $T_{smp}$ of a layer 3 infinite impulse response filtering is higher than $T_{cst}$ or the sampling rate X. The at least one filter coefficient $k_{L3}$ may comprise an L3 infinite impulse response.

In certain example embodiments, $T_{cst} \geq X$ when $k_{La} \geq 4$ and $T_{smp} > T_{cst}$. This may occur if the filterCoefficient is set to $k_{L3} \geq 4$, and the scaling of the time characteristics of the filter (i.e., filter time constant) starts if the input rate of the filter (i.e., $T_{smp}$) is higher than $T_{cst}$, as illustrated on the left side of FIG. 8. In other example embodiments, $X > T_{cst}$ when $k_{La} < 4$ and $T_{smp} > X$ This may occur if the filterCoefficient set to $k_{L3} < 4$ and the scaling of the time characteristics of the filter (i.e., filter time constant) starts if the input rate of the filter (i.e., $T_{smp}$) is higher than X, as illustrated on right hand side of FIG. 8.

In some example embodiments, NE 720 can provide a table of filter time characteristics based on the different filter input rates, which may reduce the complexity of the scaling. In certain example embodiments, NE 720 may indicate to UE 710 to scale down (reduce) time-to-trigger in case UE 710 applies scaling factors to the time characteristics of the filter. Increasing the filter time constant of the filter can introduce additional delay on measurements, and in order to reduce the overall handover delay, TTT may be shortened.

At 703, NE 720 may transmit at least one of at least one L3 filter time constant $T_{cst\_x}$ and the at least one scaling factor to UE 710. In some example embodiments, the at least one scaling factor may be transmitted in at least one radio resource control reconfiguration message and/or be configured to calculate $T_{cst\_x}$. Furthermore, NE 720 may transmit at least one indication to reduce at least one time-to-trigger when UE 710 applies the at least one scaling factor to at least one time characteristic of the L3 infinite impulse response filtering. In certain example embodiments, the at least one L3 filter time constant $T_{cst\_x}$ may comprise a table.

At 705, UE 710 may update at least one current filter time constant according to at least one of the received $T_{cst\_x}$ and the at least one scaling factor As a result, the measurement accuracy may be improved by applying the scaling factor to update the at least one current filter time constant.

Figure 9:
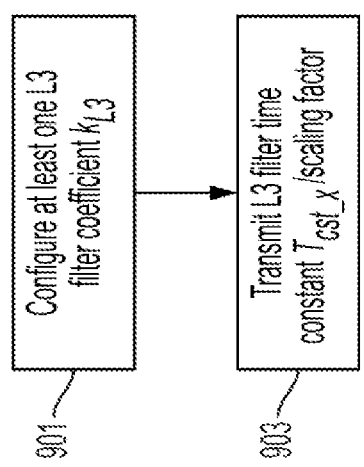
FIG. 9 illustrates an example of a flow diagram of a method, according to various example embodiments.

FIG. 9 illustrates an example of a flow diagram of a method, according to certain example embodiments. The method illustrated in FIG. 9 may be performed by a NE, such as NE 1220 illustrated in FIG. 12, according to various example embodiments.

At 901, the NE may configure at least one L3 filter coefficient $k_{L3}$. In various example embodiments, the NE may calculate the at least one L3 filter time constant $T_{cst\_x}$ according to at least one of at least one L3 filter time constant $T_{cst}$ derived from the at least one L3 filter coefficient $k_{L3}$, at least one input rate of L3 infinite impulse response filtering $T_{smp}$, at least one sampling rate X, and at least one scaling factor.

In some example embodiments, the at least one L3 filter time constant $T_{cst\_x}$ may be calculated according to $T_{cst\_x} = T_{cst} + \max((T_{smp} - \max(T_{cst}, X)), 0) \tan(\theta)$, wherein $$T_{cst} = \frac{-X \cdot \ln(2)}{\ln(1-\alpha)} = \frac{-X}{\log_2(1-\alpha)}, \alpha = 2^{\frac{-k_{L3}}{4}},$$

X comprises a sampling rate, $k_{L3}$ comprises a filter coefficient associated with L3 infinite impulse response filtering, $T_{smp}$ comprises sampling period of L3 infinite impulse response filtering, α comprises a float, and tan(θ) comprises a scaling factor.

In various example embodiments, the at least one filter coefficient $k_{La}$ may include an L3 filterCoefficient and/or a value from 0 to 19. Additionally or alternatively, the scaling factor tan(θ) may be applied when sampling period $T_{smp}$ of a layer 3 infinite impulse response filtering is higher than $T_{cst}$ or the sampling rate X. The at least one filter coefficient $k_{L3}$ may comprise an L3 infinite impulse response.

In certain example embodiments, $T_{cst} \geq X$ when $k_{La} \geq 4$ and $T_{smp} > T_{cst}$. This may occur if the filterCoefficient is set to $k_{L3} \geq 4$, and the scaling of the time characteristics of the filter (i.e., filter time constant) starts if the input rate of the filter (i.e., $T_{smp}$) is higher than $T_{cst}$, as illustrated on the left side of FIG. 8. In other example embodiments, $X > T_{cst}$ when $k_{La} < 4$ and $T_{smp} > X$. This may occur if the filterCoefficient set to $k_{L3} < 4$ and the scaling of the time characteristics of the filter (i.e., filter time constant) starts if the input rate of the filter (i.e., $T_{smp}$) is higher than X as illustrated on right hand side of FIG. 8.

At 903, the NE may transmit the at least one filter time constant $T_{cst\_x}$ to at least one UE, which may be similar to UE 1210 illustrated in FIG. 12. In some example embodiments, at least one scaling factor may also be transmitted in at least one radio resource control reconfiguration message and configured to calculate $T_{cst\_x}$. Furthermore, the NE may transmit at least one indication to reduce at least one time-to-trigger when the UE applies the at least one scaling factor to at least one time characteristic of the L3 infinite impulse response filtering. In certain example embodiments, the at least one L3 filter time constant $T_{cst\_x}$ may comprise a table.

In some example embodiments, the NE may provide a table of filter time characteristics based on the different filter input rates, which may reduce the complexity of the scaling. In certain example embodiments, the NE may indicate to the UE to scale down (reduce) time-to-trigger in case the UE applies scaling factors to the time characteristics of the filter. Increasing the filter time constant of the filter can introduce additional delay on measurements, and in order to reduce the overall handover delay, TTT may be shortened.

Figure 10:
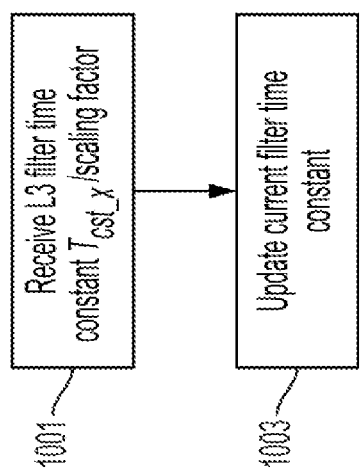
FIG. 10 illustrates an example of a flow diagram of another method, according to various example embodiments.

FIG. 10 illustrates an example of a flow diagram of another method, according to certain example embodiments. The example flow diagram of FIG. 10 may be performed by a UE, such as UE 1210 illustrated in FIG. 12, according to various example embodiments.

At 1001, the UE may receive at least one of at least one L3 filter time constant $T_{cst\_x}$ or at least one scaling factor from a NE, which may be similar to NE 1220 illustrated in FIG. 12. In some example embodiments, the at least one L3 filter time constant $T_{cst\_x}$ may be calculated according to at least one of at least one L3 filter time constant $T_{cst}$ derived from the at least one L3 filter coefficient $k_{L3}$, at least one input rate of L3 infinite impulse response filtering $T_{smp}$, at least one sampling rate X, and the at least one scaling factor.

In various example embodiments, the at least one filter time constant $T_{cst\_x}$ may be calculated according to $T_{cst\_x}=T_{cst}+\max((T_{smp}-\max(T_{cst}, X)), 0)\cdot\tan(\theta)$, wherein $$T_{cst} = \frac{-X \cdot \ln(2)}{\ln(1-\alpha)} = \frac{-X}{\log_2(1-\alpha)}, \alpha = 2^{\frac{-k_{L3}}{4}},$$

X comprises a sampling rate, $k_{L3}$ comprises a filter coefficient associated with L3 infinite impulse response filtering, $T_{smp}$ comprises a sampling period of L3 infinite impulse response filtering, a comprises a float, and $\tan(\theta)$ comprises a scaling factor.

In certain example embodiments, the scaling factor $\tan(\theta)$ may be applied when sampling period $T_{smp}$ of a layer 3 infinite impulse response filtering is higher than $T_{cst}$ or the sampling rate X Additionally or alternatively, the at least one filter coefficient $k_{L3}$ may comprise an L3 infinite impulse response. Furthermore, the at least one scaling factor may be transmitted in at least one radio resource control reconfiguration message and configured to calculate $T_{cst\_x}$. In various example embodiments, the at least one filter coefficient $K_{La}$ may comprise an L3 filterCoefficient and/or a value from 0 to 19.

In certain example embodiments, $T_{cst} \geq X$ when $k_{La}>4$ and $T_{smp}>T_{cst}$. This may occur if the filterCoefficient is set to $k_{L3}\geq4$, and the scaling of the time characteristics of the filter (i.e., filter time constant) starts if the input rate of the filter (i.e., $T_{smp}$ is higher) than $T_{cst}$ as illustrated on the left side of FIG. 8. In other example embodiments, $X>T_{cst}$ when $k_{La}<4$ and $T_{smp}>X$ This may occur if the filterCoefficient set to $k_{L3}<4$ and the scaling of the time characteristics of the filter i.e., filter time constant starts if the input rate of the filter (i.e., $T_{smp}$) is higher than X as illustrated on right hand side of FIG. 8. At 1003, the UE may update at least one current filter time constant according to at least one of the received $T_{cst\_x}$ or the at least one scaling factor.

Figure 11:
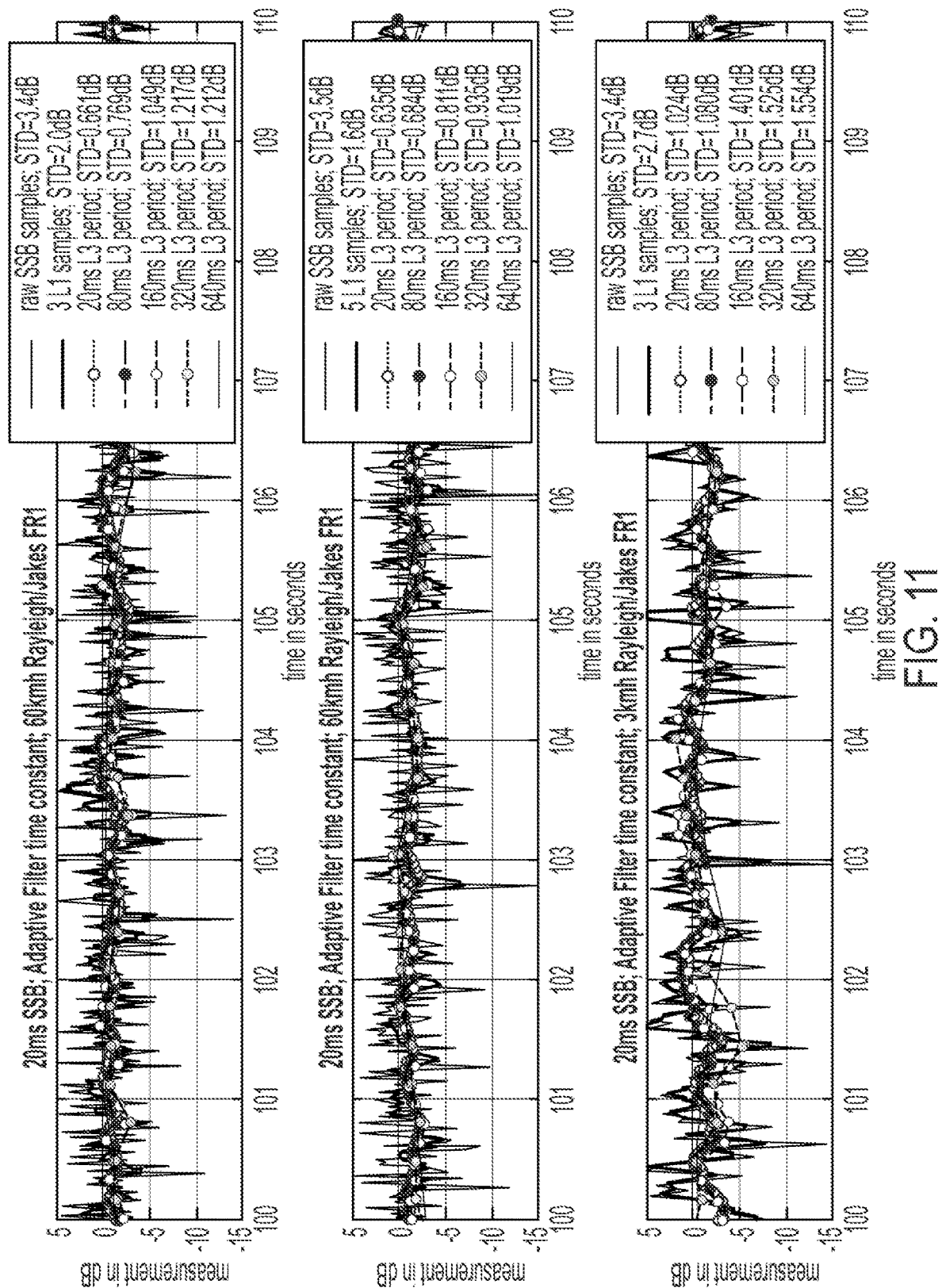
FIG. 11 illustrates an example of testing results, according to various example embodiments.
Figure 11:
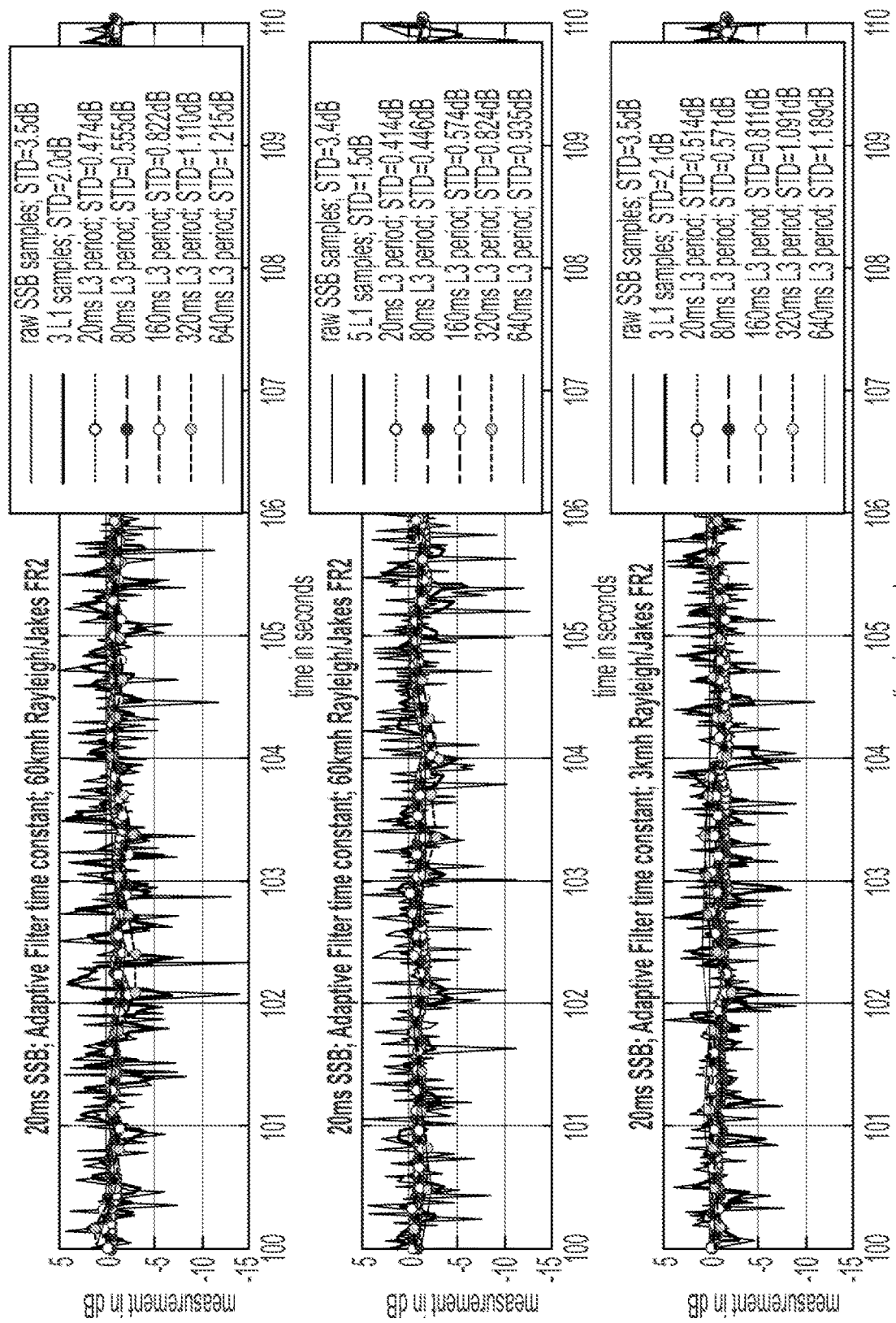

FIG. 11 illustrates an example of testing results, according to certain example embodiments. In particular, FIG. 11 illustrates simulations performed with the above example embodiments using simulations with $\tan(\theta)=1$, i.e., $\theta=45°$. The sampling rate (i.e., X) is assumed to be 200 ms for FR1, 400 ms for FR2 with filterCoefficient equal to 4. For these values of X and filterCoefficient, the filter time constant (i.e., $T_{cst}$) equals 200 ms, 400 ms for FR1 and FR2, respectively; thus, case 1 ($T_{cst}\geq X$) is used for the simulation. The UE applies scaling in case the input rate of the filter (i.e., $T_{smp}$) is higher than the filter time constant. In comparing the results between the example embodiments described in FIG. 9 and examples in FIGS. 5 and 6, adaptive filter time characteristics provide better accuracy (i.e., lower STD if the input rate of the L3 filter the increases). Table 1 below shows that, even if the input rate of the filter increases (e.g., due to multi-panel UE design, panel activation algorithm, etc.), the measurement accuracy in the same level (~1.2 standard deviation) may be sustained.

TABLE 1

Measurement Accuracy

| Cases | 3GPP (in STD) | Example embodiments herein (in STD) |
|---|---|---|
| FR1, 320 ms | 1.488 | 1.217 |
| FR1, 640 ms | 1.874 | 1.212 |
| FR2, 640 ms | 1.458 | 1.215 |

On the contrary, following the standard procedure, the measurement accuracy would be significantly impacted by the longer measurement period.

Note that, by adapting the forgetting factor and thereby the filtering coefficient, there may already be an operation pending for the UE to perform. By using the example embodiments discussed herein, one step may be used for a UE to adjust the time characteristics of the filter before adapting the forgetting factor to increase the accuracy of the measurements.

FIG. 12 illustrates an example of a system, according to certain example embodiments. In one example embodiment, a system may include multiple devices, such as, for example, UE 1210 and/or NE 1220.

UE 1210 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof NE 1220 may be one or more of a base station, such as an eNB or gNB, a serving gateway, a server, and/or any other access node or combination thereof. Furthermore, UE 1210 and/or NE 1220 may be one or more of a citizens broadband radio service device (CBSD).

NE 1220 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a 5GC.

UE 1210 and/or NE 1220 may include at least one processor, respectively indicated as 1211 and 1221. Processors 1211 and 1221 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1212 and 1222. The memory may be fixed or removable. The memory may include computer program instructions or computer code contained therein. Memories 1212 and 1222 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 1211 and 1221, memories 1212 and 1222, and any subset thereof, may be configured to provide means corresponding to the various blocks of FIGS. 7-10. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 12, transceivers 1213 and 1223 may be provided, and one or more devices may also include at least one antenna, respectively illustrated as 1214 and 1224. The device may have many antennas, such as an array of antennas configured for multiple input multiple output (MIMO) communications, or multiple antennas for multiple RATs. Other configurations of these devices, for example, may be provided. Transceivers 1213 and 1223 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 7-10). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 7-10. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

In certain example embodiments, apparatus 1210 may be controlled by memory 1212 and processor 1211 to configure at least one L3 filter coefficient $k_{L3}$. Apparatus 1210 may also be controlled by memory 1212 and processor 1211 to transmit at least one of at least one L3 filter time constant $T_{cst\_x}$ or at least one scaling factor to at least one user equipment.

In other example embodiments, apparatus 1220 may be controlled by memory 1222 and processor 1221 to receive at least one of at least one L3 filter time constant $T_{cst\_x}$ or at least one scaling factor. Apparatus 1220 may be further controlled by memory 1222 and processor 1221 to update at least one current filter time constant according to at least one of the received $T_{cst\_x}$ or the at least one scaling factor.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operation.

Certain example embodiments may be directed to an apparatus that includes means for configuring at least one L3 filter coefficient $k_{L3}$. The apparatus may further include means for transmitting at least one of at least one L3 filter time constant $T_{cst\_x}$ or at least one scaling factor to at least one user equipment.

Other example embodiments may be directed to an apparatus that includes means for receiving at least one of at least one L3 filter time constant $T_{cst\_x}$ or at least one scaling factor. The apparatus may further include means for updating at least one current filter time constant according to at least one of the received $T_{cst}$ or the at least one scaling factor.

Figure 13:
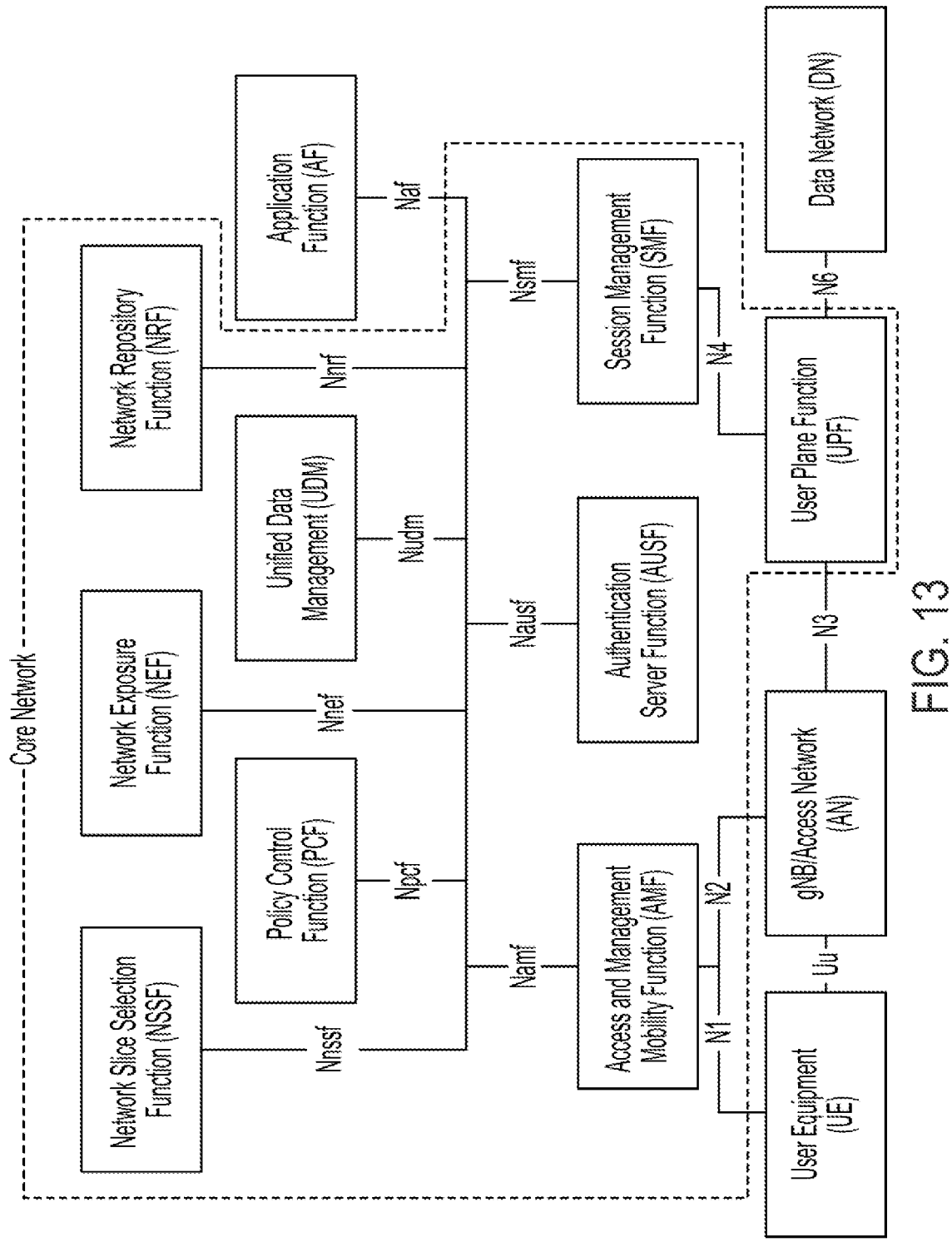
FIG. 13 illustrates an example of a 5G network and system architecture, according to certain example embodiments.

FIG. 13 illustrates an example of a 5G network and system architecture, according to certain example embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 12 may be similar to UE 1210 and NE 1220, respectively. The user plane function (UPF) may provide services such as intra-RAT and inter-RAT mobility, routing and forwarding of data packets, inspection of packets, user plane quality of service (QoS) processing, buffering of downlink packets, and/or triggering of downlink data notifications. The application function (AF) may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "various example embodiments," "certain example embodiments," "some example embodiments," or other similar language throughout this specification refers to the fact that a particular feature, structure, or characteristic described in connection with an example embodiment may be included in at least one example embodiment. Thus, appearances of the phrases "in various example embodiments," "in certain example embodiments," "in some example embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some example embodiments have been described based upon these example embodiments, it would be apparent to those of skill in the art that certain modifications, variations, and alternative constructions would be apparent, while remaining within the spirit and scope of the example embodiments.

Partial Glossary:
3GPP Third Generation Partnership Project
5G Fifth Generation
5GC Fifth Generation Core
5GS Fifth Generation System
AMF Access and Mobility Management Function
ASIC Application Specific Integrated Circuit
BS Base Station
CBSD Citizens Broadband Radio Service Device
CHO Conditional Handover
CIO Cell Individual Offset
CN Core Network
CPU Central Processing Unit
CSI-RS Channel State Information Reference Signal
DAPS Dual Active Protocol Stack
DL Downlink
eMBB Enhanced Mobile Broadband
eMTC Enhanced Machine Type Communication
eNB Evolved Node B
EPS Evolved Packet System
FR1 Frequency Range 1
FR2 Frequency Range 2
gNB Next Generation Node B
GPS Global Positioning System
HDD Hard Disk Drive
HO Handover
IEEE Institute of Electrical and Electronics Engineers
IIR Infinite Impulse Response
L1 Layer 1
L2 Layer 2
L3 Layer 3
LTE Long-Term Evolution
LTE-A Long-Term Evolution Advanced
MAC Medium Access Control
MBS Multicast and Broadcast Systems
MEMS Micro Electrical Mechanical System
MIMO Multiple Input Multiple Output
MME Mobility Management Entity
mMTC Massive Machine Type Communication
MPDCCH Machine Type Communication Physical Downlink Control Channel
MPUE Multi-Panel User Equipment
MTC Machine Type Communication
NAS Non-Access Stratum
NB-IoT Narrowband Internet of Things
NE Network Entity
NG Next Generation
NG-eNB Next Generation Evolved Node B
NG-RAN Next Generation Radio Access Network
NR New Radio
NR-U New Radio Unlicensed
PDA Personal Digital Assistance
RAM Random Access Memory
RAN Radio Access Network
RAT Radio Access Technology
RLC Radio Link Control
RR Round Robin
RRC Radio Resource Control
RS Reference Signal
RSRP Reference Signal Received Power
RSRQ Reference Signal Received Quality
SDU Service Data Unit
SFN System Frame Number
SIB System Information Block
SMF Session Management Function
SR Scheduling Report
SRB Signaling Radio Bearer
SSB Synchronization Signal Block
TB Transport Block
TR Technical Report
TS Technical Specification
TTT Time to Trigger
UE User Equipment
UL Uplink
UMTS Universal Mobile Telecommunications System
URLLC Ultra-Reliable and Low-Latency Communication
UTRAN Universal Mobile Telecommunications System Terrestrial Radio Access Network
WLAN Wireless Local Area Network

We claim:

1. An apparatus, comprising:
at least one processor; and
at least one memory including computer program code,
wherein the at least one memory and the computer program code are configured to, with the at least one processor, cause the apparatus at least to:
configure at least one layer 3 filter coefficient $k_{L3}$;
transmit at least one of at least one layer 3 filter time constant $T_{cst\_x}$ or at least one scaling factor to at least one user equipment; and
calculate the at least one layer 3 filter time constant $T_{cst\_x}$ according to at least one of:
at least one layer 3 filter time constant $T_{cst}$ derived from the at least one layer 3 filter coefficient $k_{L3}$;
at least one sampling period of layer 3 infinite impulse response filtering;
at least one sampling rate; or
at least one scaling factor,
wherein the scaling factor is applied when the sampling period of a layer 3 infinite impulse response filtering is higher than $T_{cst}$ or the sampling rate.

2. The apparatus of claim 1, wherein the at least one layer 3 filter time constant $T_{cst\_x}$ is calculated according to:
$T_{cst\_x} = T_{cst} + \max((T_{smp} - \max(T_{cst}, X)), 0)\tan(\theta)$, wherein $$T_{cst} = \frac{-X \cdot \ln(2)}{\ln(1-\alpha)} = \frac{-X}{\log_2(1-\alpha)},$$

$$\alpha = 2^{\frac{-k_{L3}}{4}},$$

X comprises a sampling rate, $k_{L3}$ comprises a filter coefficient associated with layer 3 infinite impulse response filtering, $T_{smp}$ comprises a sampling period of layer 3 infinite impulse response filtering, α comprises a float, and tan(θ) comprises a scaling factor.

3. The apparatus of claim 1, wherein the at least one layer 3 filter time constant $T_{cst\_x}$ comprises a table.

4. The apparatus of claim 1, wherein the at least one filter coefficient $k_{L3}$ comprises a layer 3 infinite impulse response.

5. The apparatus of claim 1, wherein the at least one scaling factor is transmitted in at least one radio resource control reconfiguration message and configured to calculate $T_{cst\_x}$.

6. The apparatus of claim 1, wherein the at least one memory and the computer program code are further configured to, with the at least one processor, cause the apparatus at least to:

transmit, to the at least one user equipment, at least one indication to reduce at least one time-to-trigger when the at least one user equipment applies the at least one scaling factor to at least one time characteristic of the layer 3 infinite impulse response filtering.

7. The apparatus of claim 1, wherein the at least one layer 3 filter coefficient is updated according to the at least one layer 3 filter time constant $T_{cst\_x}$.

8. An apparatus, comprising:

at least one processor; and at least one memory including computer program code, wherein the at least one memory and the computer program code are configured to, with the at least one processor, cause the apparatus at least to:

receive at least one of at least one layer 3 filter time constant $T_{cst\_x}$ or at least one scaling factor; and update at least one current filter time constant according to at least one of the received $T_{cst\_x}$ or the at least one scaling factor, wherein the at least one layer 3 filter time constant $T_{cst\_x}$ is calculated according to at least one of:

at least one layer 3 filter time constant $T_{cst}$ derived from the at least one layer 3 filter coefficient $k_{L3}$;

at least sampling period of layer 3 infinite impulse response filtering;

at least one sampling rate; or the at least one scaling factor, wherein the scaling factor is applied when the sampling period of a layer 3 infinite impulse response filtering is higher than $T_{cst}$ or the sampling rate.

9. The apparatus of claim 8, wherein the at least one filter time constant $T_{cst\_x}$ is calculated according to:

$T_{cst\_x} = T_{cst} + \max((T_{smp} - \max(T_{cst}, X)), 0) \tan(\theta)$, wherein $$T_{cst} = \frac{-X \cdot \ln(2)}{\ln(1-\alpha)} = \frac{-X}{\log_2(1-\alpha)},$$

$$\alpha = 2^{\frac{-k_{L3}}{4}},$$

X comprises a sampling rate, $k_{L3}$ comprises a filter coefficient associated with layer 3 infinite impulse response filtering, $T_{smp}$ comprises a sampling period of layer 3 infinite impulse response filtering, α comprises a float, and tan(θ) comprises a scaling factor.

10. The apparatus of claim 8, wherein the at least one filter coefficient $k_{L3}$ comprises a layer 3 infinite impulse response.

11. The apparatus of claim 8, wherein the at least one scaling factor is transmitted in at least one radio resource control reconfiguration message and configured to calculate $T_{cst\_x}$.

12. The method of claim 11, wherein the at least one layer 3 filter coefficient is updated according to the at least one layer 3 filter time constant $T_{cst\_x}$.

13. The apparatus of claim 8, wherein the at least one memory and the computer program code are further configured to, with the at least one processor, cause the apparatus at least to:

transmit at least one indication to reduce at least one time-to-trigger when the at least one user equipment applies the at least one scaling factor to at least one time characteristic of the layer 3 infinite impulse response filtering.

14. The apparatus of claim 8, wherein the at least one layer 3 filter coefficient is updated according to the at least one layer 3 filter time constant $T_{cst\_x}$.

15. A method, comprising:

receiving, by a user equipment, at least one of at least one layer 3 filter time constant $T_{cst\_x}$ or at least one scaling factor; and updating, by the user equipment, at least one current filter time constant according to at least one of the received $T_{cst\_x}$ or the at least one scaling factor, wherein the scaling factor is applied when sampling period of a layer 3 infinite impulse response filtering is higher than $T_{cst}$ or the sampling rate.

16. The method of claim 15, wherein the at least one layer 3 filter time constant $T_{cst\_x}$ is calculated according to at least one of:

at least one layer 3 filter time constant $T_{cst}$ derived from the at least one layer 3 filter coefficient $k_{L3}$;

at least one sampling period $T_{smp}$ of layer 3 infinite impulse response filtering;

at least one sampling rate X; or the at least one scaling factor.

17. The method of claim 15, wherein the at least one filter time constant $T_{cst\_x}$ is calculated according to:

$T_{cst\_x} = T_{cst} + \max((T_{smp} - \max(T_{cst}, X)), 0) \tan(\theta)$, wherein $$T_{cst} = \frac{-X \cdot \ln(2)}{\ln(1-\alpha)} = \frac{-X}{\log_2(1-\alpha)},$$

$$\alpha = 2^{\frac{-k_{L3}}{4}},$$

X comprises a sampling rate, $k_{L3}$ comprises a filter coefficient associated with layer 3 infinite impulse response filtering, $T_{smp}$ comprises a sampling period of layer 3 infinite impulse response filtering, a comprises a float, and tan(θ) comprises a scaling factor.

18. The method of claim 15, wherein the at least one scaling factor is transmitted in at least one radio resource control reconfiguration message and configured to calculate $T_{cst\_x}$.

* * * * *